Patented Feb. 1, 1949

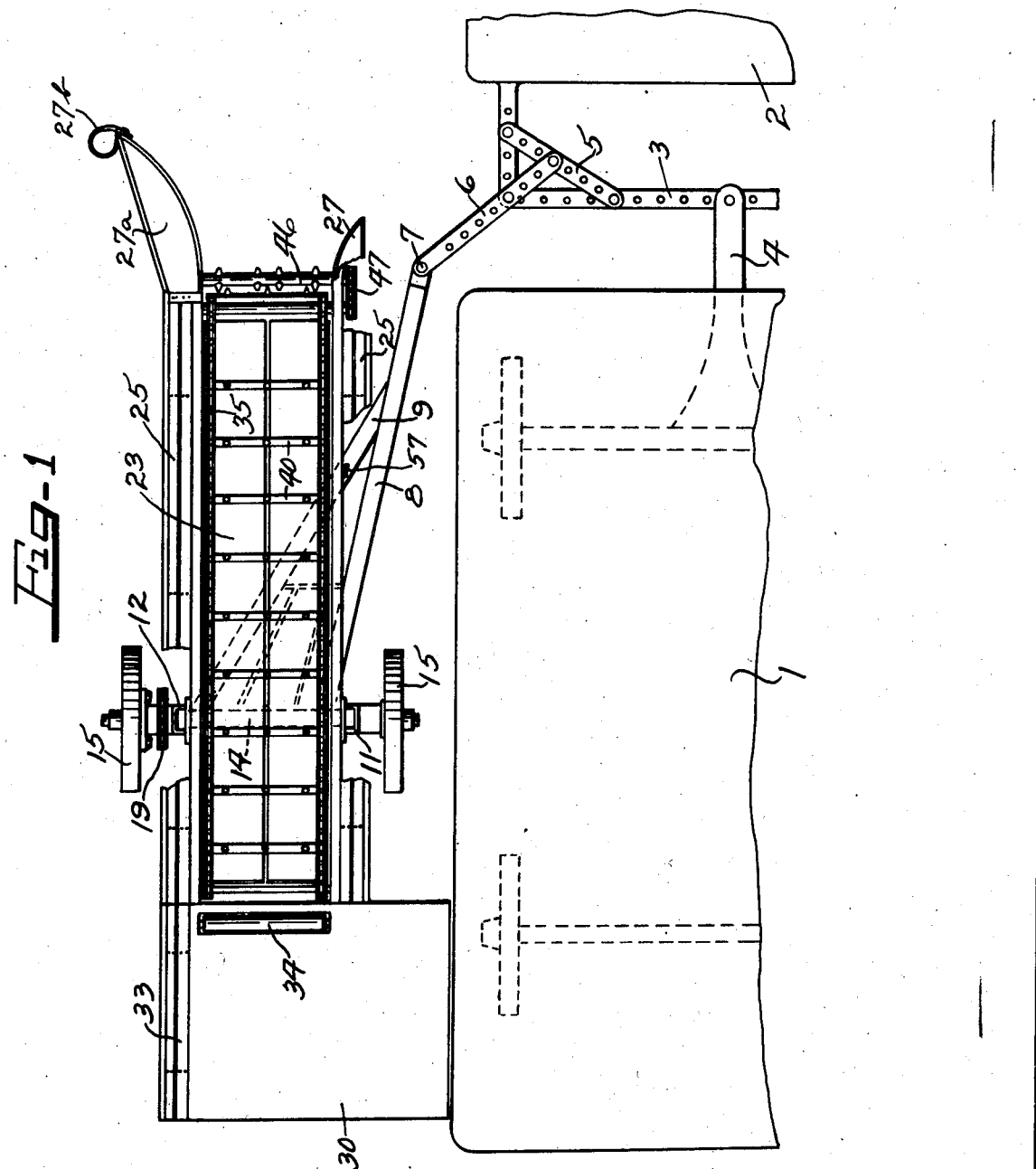

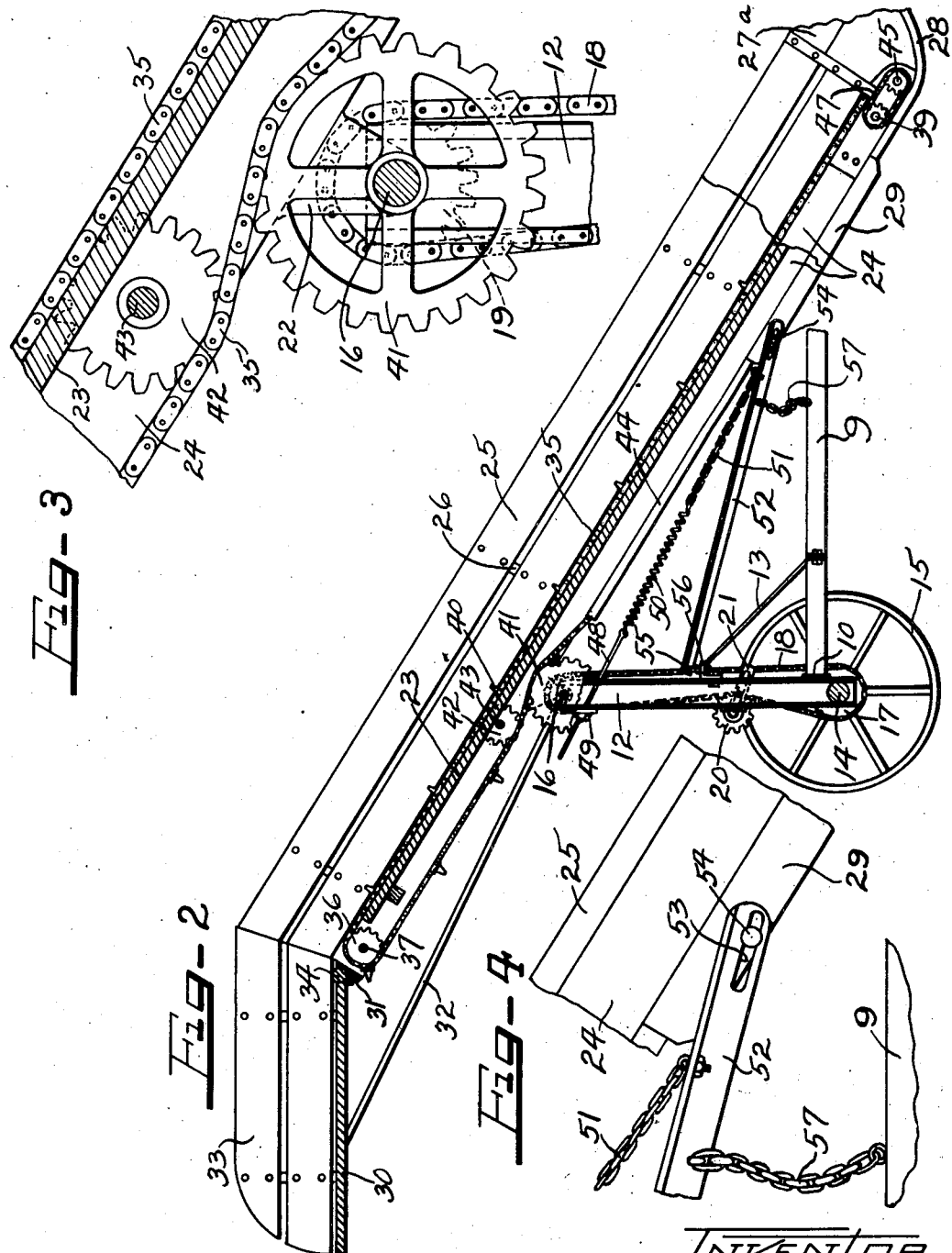

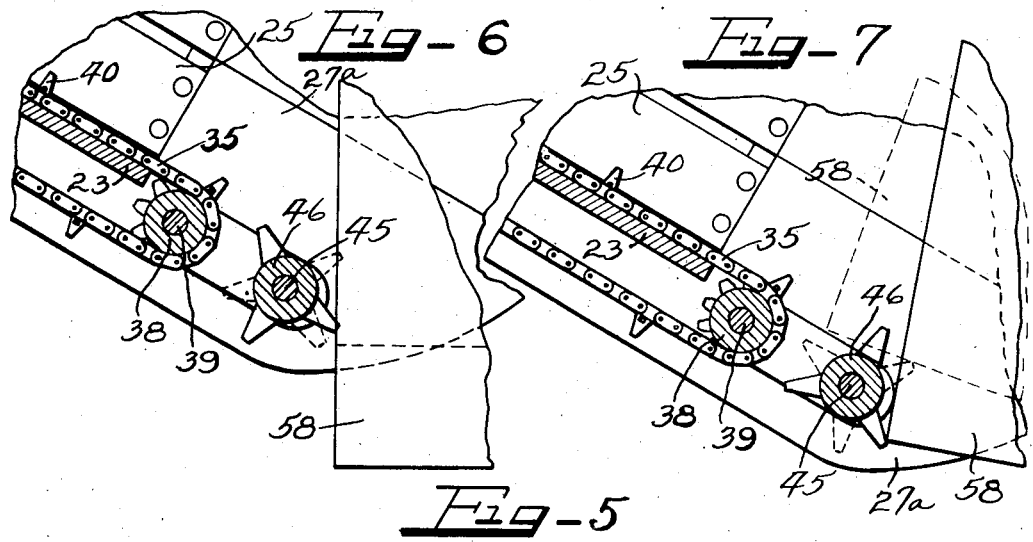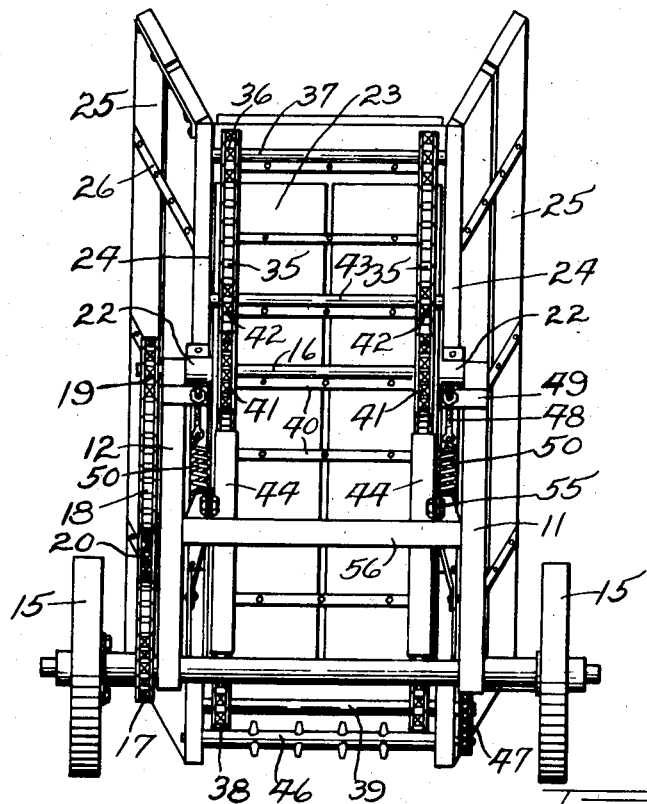

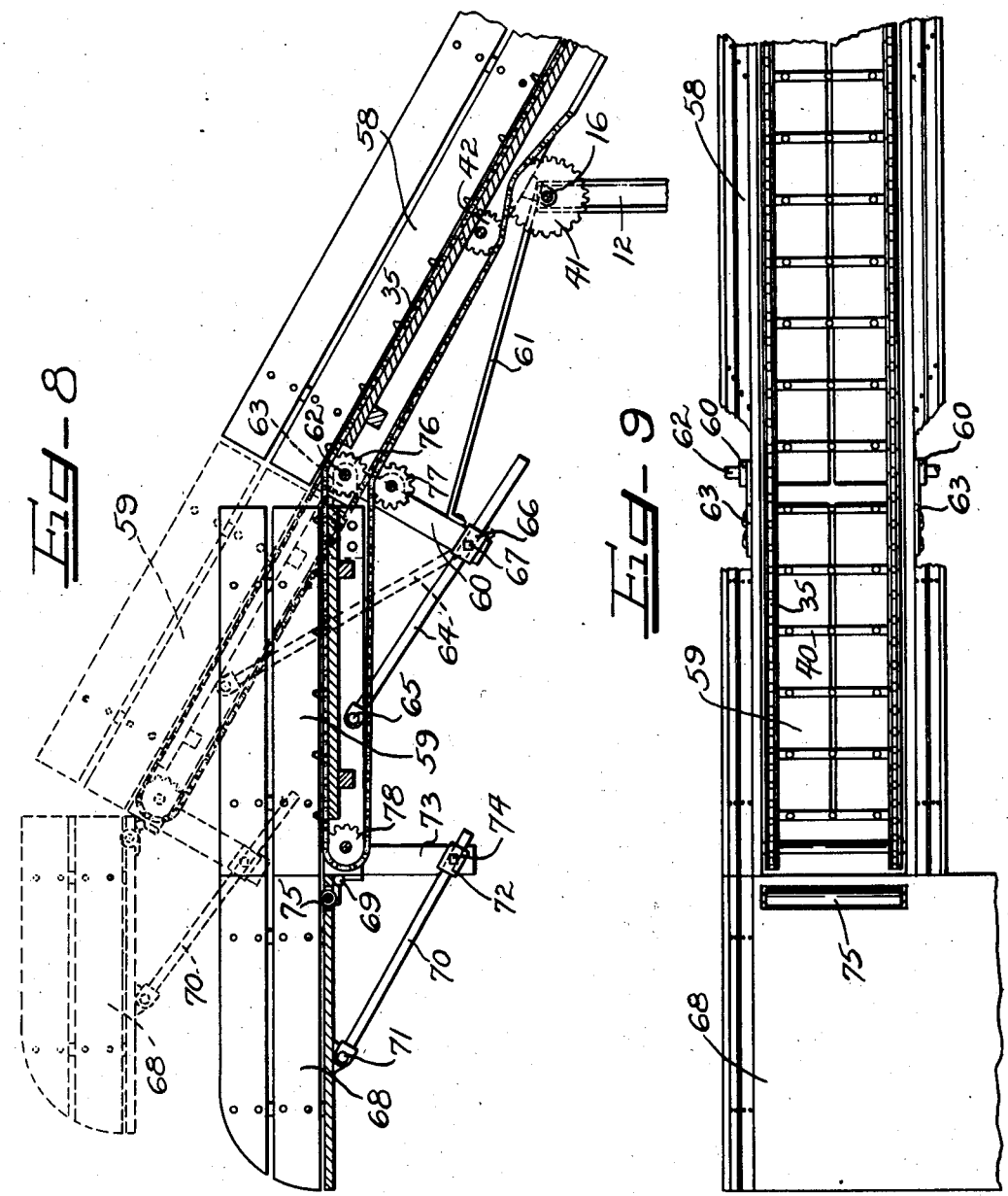

2,460,441

UNITED STATES PATENT OFFICE 2,460,441

AGRICULTURAL LOADING MACHINE

Everett H. Appel, Aurora, Ill.

Application April 19, 1944, Serial No. 531,693

6 Claims. (Cl. 214—41)

This invention relates to improvements in an agricultural loading machine, and more particularly to a loading machine of the mobile type highly desirable for the elevating of bales, shocks, and similar items to an adequate level for proper piling on a wagon, truck or other transporting vehicle, although the invention may have other uses and purposes as will be apparent to one skilled in the art.

This application is a continuation in part of my copending (later abandoned) application entitled "Agricultural loading apparatus" filed February 8, 1943, Serial No. 475,114.

In the harvesting of crops, it is a common expedient to make bales, shocks, and the like, in the field, and scatter these along the ground in more or less evenly defined rows. Later, other transporting apparatus is brought through the field and the bales or shocks are picked up and loaded to be carried off to their ultimate destination. In the past various forms of loading devices for articles of this character have been developed, but these devices are not nearly so economical as is desirable, especially for smaller farms where a heavy cash outlay for farm equipment is not warranted or not possible. Frequently, these formerly known loading devices required the attention of more than a desirable or available number of men, and could not be operated satisfactorily in conjunction with a wagon, truck or other transporting vehicle. Also, these formerly known loading devices were frequently exceedingly cumbersome, required various adjustments in order to move them from field to field, and frequently required a separate power source to actuate them. In addition, loading devices of this type heretofore known were frequently not usable in conjunction with wagons or other transporting vehicles of varying height, since the loader itself only had one discharge height, and very frequently these loaders required the attention of an operator in order to straighten bales, shocks, and the like lying on the ground so that such loads could properly be engaged and picked up by the loading device.

With the foregoing in mind, it is an important object of the instant invention to provide an agricultural loading machine which is extremely simple in construction and operation, and highly economical to manufacture and use.

Another object of the invention is the provision of an agricultural loading device embodying a mobile frame carrying an inclined loading trough, with the lower end of the loading trough normally floating above ground level.

It is also an object of this invention to provide an agricultural loading machine so arranged as to operate beside a vehicle, or be drawn by a vehicle, from which both the motive and operating power for the loading machine is obtained, the loading machine needing no adjustments for movement from field to field or for operation within a field, the machine itself automatically accommodating itself in keeping with idle travel or actual work.

A further feature of the invention resides in the provision of an agricultural loading machine including an inclined loading chute having a rotary pickup member on the lower end thereof, and an endless conveyor operating along said trough, and having a drive connection from the forward shaft of the endless conveyor with the rotary pick-up member, whereby both the shaft and the member rotate in the same direction, as the latter is driven by the former.

Still another object of the invention resides in the provision of an agricultural loading device embodying an inclined loading trough with a horizontally disposed discharge platform at the upper end of the trough, such platform being arranged for a sidewise discharge or a rearward discharge of a bale, shock, or the like, therefrom.

It is a further object of the invention to provide an agricultural loading device embodying an inclined loading trough with a discharge platform at the upper end of the trough, there being means by which the platform may be selectively adjusted as to height to enable the loading device to be used with transporting vehicles varying in height.

A further feature of the invention resides in the provision of an agricultural loading machine having a mobile frame, with a forwardly inclined loading trough pivoted intermediate its ends to the frame, and an endless conveyor associated with the trough embodying a chain drive, with the power applying means located on the shaft forming the pivot point for the trough.

Also a feature of this invention, and a highly important feature, resides in the provision of an agricultural loading machine embodying a mobile frame carrying an inclined loading trough, with the lower end of the loading trough normally floating above the ground, but arranged to automatically drop toward the ground when a load is picked up.

A further feature of this invention resides in the provision of an agricultural loading machine embodying a mobile frame carrying an inclined loading trough, the machine being so arranged that the lower end of the loading trough automatically lowers when a load is being picked up, and automatically rises to a position elevated above the ground after picking up a load, so that no adjustments are necessary for picking up loads or transporting the machine from field to field.

Still another feature of the invention resides in the provision of an agricultural loading machine embodying a loading trough, normally inclined in a forward direction, with a discharge platform at the upper end of the trough, and rotary means associated with the platform to facilitate the placing of a bale, shock, or similar load thereon.

Another important object of the instant invention resides in the provision of an agricultural loading device equipped with means to automatically straighten a bale, shock, or similar load relatively to the loading device for pick-up purposes, without gouging or otherwise injuring the load.

Also an object of the invention is the provision of an agricultural loading device embodying an inclined loading trough with conveying means associated with the trough to elevate a bale, shock, or similar load upwardly along the trough, and wherein the trough is made up of pivotally connected sections, the upper section being angularly adjustable relatively to the next lower section, and the conveying means functioning to move a load regardless of the degree of such angular adjustment.

While some of the more salient features, characteristics and advantages of the instant invention have been above pointed out, others will become apparent from the following disclosures, taken in conjunction with the accompanying drawings, in which:

Figure 1 is a fragmentary plan view of a loading machine embodying principles of the instant invention in operative association with a transporting vehicle as well as a power vehicle, the latter drawing both the transporting vehicle and loading machine;

Figure 2 is a side elevational view of the loading machine of Figure 1, with parts broken away and parts shown in section;

Figure 3 is a fragmentary vertical sectional view, this figure being an enlargement of the structure in the central portion of Figure 2;

Figure 4 is a fragmentary side elevational view, this view being an enlargement of the lower right central portion of Figure 2;

Figure 5 is a rear view in elevation of the loading machine of Figures 1 and 2, with the discharge platform and other parts removed for the purpose of clarity;

Figure 6 is an enlarged fragmentary vertical sectional view through the forward end of the loading trough, indicating diagrammatically an initial step in the picking up of a load;

Figure 7 is a view like Figure 6, but showing the loading trough in a different position during a more advanced stage of picking up a load;

Figure 8 is a fragmentary longitudinal vertical sectional view, similar in character to Figure 2, of a loading device of slightly different construction embodying principles of the instant invention, indicating in dotted lines how a portion of the device may be adjusted; and Figure 9 is a fragmentary top plan view of the structure of Figure 8.

As shown on the drawings:

In Figure 1, the illustrated embodiment of the instant invention is shown associated with a transporting vehicle 1 and a power vehicle 2. The transporting vehicle may be a wagon, trailer, or any other suitable form of vehicle which carries the loaded shocks, bales or equivalent items picked up in the field to their ultimate destination. The power vehicle 2 may suitably be a tractor, and this vehicle provides the pulling power both for the transporting vehicle 1 and the loading machine.

A combination hitch arrangement is provided for coupling the transporting vehicle 1 and the loading machine to the power vehicle 2. The power vehicle 2 is provided with a yoke 3 extending from the rear thereof, to which a draw bar 4 from the transporting vehicle 1 is connected. Adjacent the inner corner of the yoke 3 a diagonal link 5 is pinned to the yoke at each end through selected apertures in the yoke depending upon the angle at which it is desired to dispose the link 5. A drag link 6 is similarly pinned both to the corner portion of the yoke 3 and to the diagonal link 5 so as to be disposed rigidly at an angle to the line of travel of the power vehicle 2. The other end of the drag link 6 may be connected as at 7 to the forward portion of the loading machine frame. Thus it will be seen that the power vehicle 2 will draw both the transporting vehicle 1 and the loading machine with the loading machine disposed at one side of the vehicle 1 and traveling a parallel path thereto.

The frame of the loading machine may be of any suitable construction, but is preferably formed in a manner in keeping with light weight and more than ample rigidity and stability. The frame includes a main horizontally disposed portion and an upright portion. The horizontal portion includes a member 8 to the forward end of which is connected the drag link 6 and a shorter member 9, the forward end of which is attached to the member 8. Both of these members extend obliquely with respect to the axis of the loading machine and the members are connected at opposite ends of a cross-connection 10 between a pair of vertical portions of the frame. Suitable sub-frame stabilizers may be utilized as indicated by the dotted lines in Figure 1, and as represented by numeral 13 in Figure 2, wherever they may be deemed necessary. A transverse shaft 14 is disposed through the lower part of the upright frame portion, and this shaft carries on its outer ends wheels 15—15 which render the entire loading structure mobile. These wheels are all that are necessary for the structure in view of the fact that the forward portion of the frame is pinned to the drag link 6 and thus kept elevated when the loader is connected for travel.

At the upper end of the upright frame portion a transverse shaft 16 is carried which is rotatably driven by a chain and sprocket connection from one of the wheels 15. As seen best in Figures 2 and 5, a sprocket wheel 17 is preferably connected with the outer wheel 15, and a chain 18 is trained over both the sprocket wheel 17 and another sprocket wheel 19 on the shaft 16. An idler sprocket 20 is carried upon an adjustable arm 21 connected to the adjacent frame upright 12 to maintain proper tension in the chain 18. This entire sprocket drive arrangement, as best shown in Figure 5, is preferably on the outside of the frame upright 12 where it is readily available for adjustment, if necessary. It will be appreciated that as the loading machine is drawn along the ground by the power vehicle 2, the drive for the moving parts of the loading machine is picked up from one of the wheels 15 through the sprocket chain 18 and transferred to the shaft 16. The shaft 16 will therefore be rotated in the same direction as the wheels 15 are traveling.

Pivotally connected intermediate its ends to the shaft 16, as indicated at 22—22, is a loading trough inclined in the direction of motion of the device. This trough includes a floor 23 having a pair of side rails 24—24 extending therebelow on each side thereof, and above the side rails is a pair of outwardly flaring side walls 25—25. As seen in Figures 2 and 5, the flaring side walls 25—25 may be made up of planks held in place by spaced metal straps 26, thereby providing a very economical and yet sturdy structure. At the lower end of the loading trough is a pair of opposed wing skids 27 and 27a attached to the ends of the side walls and reinforced, as indicated at 28, on their under edges for sliding contact with the ground. As seen in Figure 2, the skids 27 and 27a are also secured to the members 24—24 of the trough, and an added metallic frame strip 29 is attached to the members 24—24 immediately behind the termination of the skids.

With reference to Figure 1 it will be noted that at least one of the wing skids, in this instance the wing skid 27a, is made extra large so that it extends well in front of the trough. The outer portion of this wing skid is provided with a guiding element 27b, which is preferably curvate to prevent gouging in to a load of the character of a bale or a shock, and in the illustrated instance is shown in the form of a loop.

This wing skid 27a functions as a load straightener. Not infrequently it happens that a bale or the like in falling from the baling machine lies on the ground obliquely, crosswise, or askew in respect to the path followed by the loading device when it picks up the bales or the like. Obviously, it is desirable and easier to pick up a bale end first so that the longer dimension of the bale follows the axis of the trough. When a bale lies askew with respect to the path traveled by the loading device, the extra large wing skid 27a together with its guide member 27b will initially engage that bale and straighten it relatively to the trough so that the end of the bale may be engaged by the pick-up device to be later described herein, and the bale will begin its travel up the trough end first. The curvate form of the guide element 27b prevents gouging or otherwise injuring the bale at the time its position is altered to facilitate picking it up.

It will therefore be noted that the instant invention automatically repositions an out-of-line load without stopping its travel so that the particular load may be properly handled with greater facility. If so desired, the wing 27 may be constructed in similar fashion to the wing 27a, but in most cases it is only necessary to have the wing on the opposite side of the loading device from the transporting vehicle or the power vehicle so constructed.

At the upper end of the loading trough a discharge platform 30 is provided. This platform may be connected to the trough by a suitable angle iron connection 31 (Figure 2) and braced in any suitable manner such as by rods 32 connected with the bottom of the platform and the aforesaid vertical frame structure by way of the shaft 16. With reference to Figure 1, it will be seen that the discharge trough 30 preferably extends beyond the loading chute on the inner side of the loading machine next to the transporting vehicle 1. It will also be noted from the showing in this figure that the discharge platform 30 is provided with a side wall 33 similar in construction to one of the aforesaid side walls 25 of the trough, but the loading platform is provided with such wall on one side only thereof. Thus, bales, shocks and the like, brought up to the platform 30, may be discharged therefrom either straight rearwardly substantially in line with the loading trough, or sidewise toward the vehicle 1, as the structure is viewed in Figure 1, thus providing a choice for the operator so that he may more expeditiously remove loads from the discharge platform. Mounted in the floor of the discharge platform immediately adjacent the loading trough is a free roller 34 to aid in the movement of bales or the like on to the discharge platform.

For the purpose of transporting loads from the ground to the discharge platform 30, an endless conveyor is associated with the inclined loading trough. This conveyor includes a pair of similar traction chains 35—35 on each side thereof, each of which is trained over a suitable sprocket 36 on a shaft 37 journaled in the vertical wall portions 24 of the loading trough at the upper end thereof, and a similar sprocket wheel 38 on a shaft 39 at the lower end of the loading trough. Between the traction chains 35—35 transverse spiked flights 40 are secured at spaced intervals. The conveyor is so disposed that the flights travel upwardly along the floor 23 of the loading trough. Motion is imparted to the endless conveyor by means of a pair of spaced sprockets 41—41 on the shaft 16, such sprockets engaging with the chain 35—35 underneath the loading trough, as seen clearly in Figure 3. Preferably immediately above the sprockets 41—41, idler sprockets 42—42 carried on a shaft 43, engage the inner side of the chain, and on the lower side of the sprockets 41—41 each chain enters a guideway 44, thus, each chain is bowed upwardly over its respective sprocket 41 by the action of the sprocket 42 and the guideway 44 to insure a positive drive of the conveyor at all times.

At the lower forward end of the loading trough, a transverse shaft 45 is disposed between the aforesaid wing skids 27—27a directly in advance of the endless conveyor, as seen best in Figures 6 and 7. This transverse shaft 45 carries a spiked rotary pick-up member 46 thereon. The shaft 45 is driven in the same direction as the lower shaft 39 of the endless conveyor by means of a chain and sprocket connection 47 from the shaft 39, as seen best in Figure 2. Thus, as viewed in Figures 6 and 7, the shafts 39 and 45 both travel counter-clockwise as the top flight of the conveyor travels up the inclined loading trough.

It will be noted that the placing of the conveyor drive on the same shaft to which the loading trough is pivotally connected results in marked economy of construction. Likewise, driving the pick-up member from the conveyor or elevator means results in synchronous movement of these parts so that once a load is picked up by the member 46, it is carried smoothly and evenly up the loading trough to the discharge platform 30. The free roll 34 in the floor of the discharge platform provides an easy means for the conveyor moving the load well on to the platform.

Means are also provided normally tending to maintain the forward and lower end of the loading trough floating above the ground. In the illustrated embodiment, these means include an eyebolt 48 secured to the cross member 49 in an adjustable manner by a suitable nut. The cross member 49 is located immediately below the shaft 16 on the upright portion of the frame, as seen in Figures 2 and 5. To the lower and free end of the eyebolt is a spring 50 in turn connected through a chain 51 to the forward portion of a lift bar 52. As best seen in Figure 4, the lift bar 52 has an elongated slot 53 in the forward end engaged over a stud 54 secured to the aforesaid metallic frame portion 29 on the lower portion of the loading trough. The opposite end of the lift bar 52 is pivotally connected as at 55 to a transverse frame member 56. The same elevating structure as just above described is on each side of the loading trough, as shown in Figure 5. The springs 50—50 are under sufficient tension so as to elevate the trough through the lift bars 52—52 and maintain the forward end of the trough, including the skids 27 and 27a floating above ground level when there is no load on the conveyor. In order to prevent the forward end of the loading trough rising too high when a load being elevated by the conveyor passes above the pivot shaft 16 of the trough, a chain or equivalent limiting element 57 is connected between one of the lift bars 52 and the aforesaid fixed frame member 9. The length of this limiting element therefore determines the backward pivotal movement of the loading trough.

It will be understood that any suitable form of clutch means may be associated between the drive sprocket 17 and the hub of the wheel 15, if so desired. Such clutch mechanism permits the conveyor to be idle during travel of the loading machine from one working location to another.

In operation, the instant invention is quite simple and very highly effective. The loading machine may be attached in the manner shown in Figure 1 to travel alongside and parallel with a transporting vehicle. Assuming that it is desired to pick up a series of bales from the ground for loading in the transport vehicle, the motive apparatus is driven so that the loading device is in line with the row of bales. As the loading device travels over free ground, the forward end of the loading trough floats well above ground level so as to avoid ordinary variances in surface contour. When so working, the conveyor, as well as the rotary pick-up member 46, are, of course, operating.

As the loading machine meets with a load such as a bale, indicating diagrammatically at 58 in Figure 6, the spikes of the rotary pick-up 46 will first contact the bale after the bale has been aligned properly by one or both of the wing skids 27 and 27a, if such proves necessary. As viewed in Figure 6, it will be seen that the forward end of the loading trough is still floating well above the ground when the pick-up member contacts the bale. As the spikes of the pick-up member bite into the bale, it being understood that the entire loading device is continuously traveling forwardly, the bale is elevated as indicated in Figure 7, and simultaneously with the elevation of the bale the trough is pivoted downwardly by the engagement of the pick-up member with the bale against the action of the tension springs 50—50 so that the skids 27 and 27a substantially ride on the ground.

The bale is then easily moved backwardly by the pick-up member and delivered onto the conveyor. It will be noted, therefore, that the pick-up element 46 performs the double function of picking up the bale and delivering that bale onto the conveyor. As the bale smoothly travels up the loading trough, the spring 50—50 gradually elevate the forward end of the loading trough above ground level until the next load is contacted. The limiting element 57 prevents more than a desired backward pivoting of the loading trough in the event a bale is on the trough above the pivot shaft 16 with no load on the forward end of the trough. The bale is easily discharged by the conveyor onto the discharge platform 30 with the aid of the free roller 34 and the bale may be manually removed from the discharge platform either sidewise or rearwardly, as may be most desired.

In Figures 8 and 9 I have illustrated a somewhat different form of construction for the instant invention, wherein the discharge platform is selectively adjustable as to height. With this arrangement the discharge platform may be elevated or lowered in keeping with the height of the body on the transport vehicle with which the loading device is associated. With the exception of the upper end of the loading trough and the platform associated with it, the structure in Figures 8 and 9 is substantially the same as that previously described in connection with Figures 1 to 7, inclusive.

With reference now to Figures 8 and 9 it will be seen that in the modified construction, the loading trough includes sections 58 and 59 angularly adjustable relatively to each other. The lower section 58 is pivotally mounted on the shaft 16 carried by the upright frame members 11 and 12, as previously described. At the upper end thereof this lower section 58 carries a depending frame structure including side members 60—60 each of which is given added support by a frame member 61 connected with the pivot bracket of the trough adjacent the shaft 16. These frame members 60—60 carry a transverse shaft 62 and a pair of brackets 63—63 extending from the upper trough section 59 are pivotally associated with the shaft 62. Oppositely dispose brace rods 64 support the upper trough section 59. The upper ends of these rods 64 are pivotally connected to the trough section at an intermediate point as indicated at 65. The lower ends of these brace rods are each slidably engageable in a sleeve 66 pivotally associated with the lower end of a frame member 60. The sleeve and brace rods are maintained in a desired position of adjustment by means of a set screw 67 or the equivalent.

A discharge platform 68, similar in construction to the above described platform 30, is pivoted to the upper end of the trough section 59 as indicated at 69. A brace rod 70 is disposed on each side of the platform 68 and is pivotally connected at one end to the platform as indicated at 71. The other end of the brace rod is slidable in a sleeve 72 pivotally associated with a frame member 73 depending from the trough section 59. Both the brace rod and sleeve are locked in a suitable position of adjustment by set screw 74 or the equivalent. The platform 68 may be provided with a free running roller 75 in the floor thereof corresponding to the roller 34 above described.

In this instance, the same endless conveyor including chains 35 and flights 40 may be used. The conveyor is driven by the same drive sprocket 41 and proper engagement with the sprocket is insured by an idler sprocket 42. However, an additional set of sprocket wheels are utilized to effect a bend in the conveyor as shown by the full lines in Figure 8. These sprockets embody a pair of sprocket wheels 76 on the shaft 62 and a similar pair of sprocket wheels 77. The sprockets 76 engage the upper reach of the chains and the sprockets 77 engage the lower reaches of the chains. Another pair of sprockets 78 are carried at the upper end of the trough section 59, these sprockets corresponding to the sprockets 36—36 seen in Figures 2 and 5.

With the arrangement just above described, the loading device may be selectively adjusted to correspond in height with substantially any transporting vehicle. If the transporting vehicle has a relatively low body, the loading device may be left in the full line position of Figure 8 with the upper section 59 of the trough at the same level as the platform 68. In the event the load is piled higher, or a transporting vehicle with a higher body is used, the upper trough section 59 may be elevated to the dotted line position seen in Figure 8. Such elevation requires only a simple manipulation of the set screws 67 and a sliding of the brace rods 64 to hold the trough section at the desired height. In similar manner, the discharge platform 68 may be adjusted relatively to the trough section 59 so that at the increased height the discharge platform will be again disposed substantially horizontally. The showing in Figure 8 indicates in full lines the lower adjustment of the apparatus, and indicates in dotted lines the highest adjustment of the apparatus. It will be appreciated, of course, that any desired in-between adjustment may be effected in the same manner. Outside of the adjustable feature, the structure seen in Figures 8 and 9 functions in substantially the same manner as above described in connection with the structure shown in Figures 1 to 7, inclusive.

From the foregoing, it is apparent that I have provided a highly efficient agricultural loading machine which automatically adjusts itself for the picking up of a load and for traveling between loads or along the highway between fields, the front portion of the loading trough floating above ground level except when a load is being picked up. It is also apparent that the loading machine automatically straightens or aligns loads to be picked up so that the loads may be handled with the greatest facility and the discharge end of the loading machine may be adjusted to accommodate loads or transporting vehicles of various heights. It will further be noted that the loading machine is economical in construction and very economical in use, embodying more than ample strength and rigidity, along with lightweight construction.

It will, of course, be understood that various details of construction may be varied through a wide range without departing from the principles of this invention, and it is, therefore, not the purpose to limit the patent granted hereon otherwise than necessitated by the scope of the appended claims.

I claim as my invention:

1. In an agricultural loading device for bales and the like, a mobile frame including a fixed upright frame portion, an inclined loading trough pivoted intermediate its ends to said upright frame portion, spring means connected between said upright frame portion and a part of said trough forward of said frame portion to maintain the leading end of the trough floating above pick-up position between loads, and a pick-up mechanism adjacent the leading end of said trough to engage a load above pick-up position and cause a downward movement of the leading end of said trough against the action of said spring means as the load is picked up.

2. In a bale loading device, a mobile frame, an inclined loading trough carried by said frame, means to elevate a bale along said trough, yieldable means supporting said trough with the lower end of the trough normally well above pick-up position, and rotary pick-up means at the lower end of said trough for engagement with a bale, said yieldable means being properly proportioned to the mass of the bale to permit said pick-up means while engaged with a bale to draw down the lower end of said trough to pick-up position.

3. In a loading device for bales and the like a mobile frame, an inclined loading trough pivotally connected to said frame, means to elevate a load along said trough, yieldable means normally holding the lower end of said trough floating well above pick-up position to avoid obstacles in travel, and rotary pick-up means at the lower end of said trough for engaging a load at a height above pick-up position, said yieldable means being properly proportioned to the mass of such a load to permit said pick-up means to work down said load and draw down the lower end of said trough to load pick-up position, and a load straightening wing flaring outwardly from the lower end of said trough and floating with the trough to shift a load into proper position for engagement by said pick-up means.

4. In an agricultural loading device for bales and the like, a mobile frame, an inclined loading trough pivoted intermediate its ends to said frame, and resilient means connected with said frame and with said trough at a point forward of the pivot point to normally maintain the forward end of said trough elevated well above pick-up position, said resilient means being yieldable and proportioned to the mass of a load to permit said trough end to move downwardly when the device engages and picks up a load.

5. In an agricultural loading device for bales and the like, a mobile frame, an inclined loading trough pivoted intermediate its ends to said frame, load moving means associated with said trough, means holding said trough in a position with the forward end of the trough floating above pick-up position but yieldable and properly proportioned to the mass of a load to permit said forward end to move downwardly when said load moving means engages and picks up a load, and means to limit the backward pivotal movement of said trough when a load passes above the pivot point.

6. In an agricultural loading machine for bales and the like, a mobile frame, an inclined loading trough pivoted on said frame, means normally maintaining the lower end of said trough elevated well above pick-up position but yieldable and properly proportioned to the mass of a load to permit lowering of said end when a load is being picked up, an endless conveyor associated with said trough, a rotary pick-up element at the lower end of said trough to engage a load and pull down the lower end of said trough and deliver the load to said conveyor, and laterally flaring means adjacent the lower end of said trough to straighten a load relatively to said conveyor for engagement by said pick-up element.

EVERETT H. APPEL.

(References on following page)

REFERENCES CITED

The following references are of record in the file of this patent:

UNITED STATES PATENTS

| Number | Name | Date |
|---|---|---|
| 956,816 | Mogg et al. | May 3, 1910 |
| 1,124,414 | Gilliam | Jan. 12, 1915 |
| 1,246,167 | Saxevik | Nov. 13, 1917 |
| 1,258,142 | Pitcher | Mar. 5, 1918 |
| 1,570,256 | Hunt | Jan. 19, 1926 |
| 1,853,253 | Bennett | Apr. 12, 1932 |
| 2,174,605 | Spencer | Oct. 3, 1939 |
| 2,208,128 | Holbrook et al. | July 16, 1940 |
| 2,267,303 | Jordan | Dec. 23, 1941 |
| 2,312,779 | Smith | Mar. 2, 1943 |
| 2,325,704 | Passa | Aug. 3, 1943 |